(No Model.) 3 Sheets—Sheet 1.
W. M. FOWLER.
LIQUID DISPENSING APPARATUS.
No. 522,322. Patented July 3, 1894.
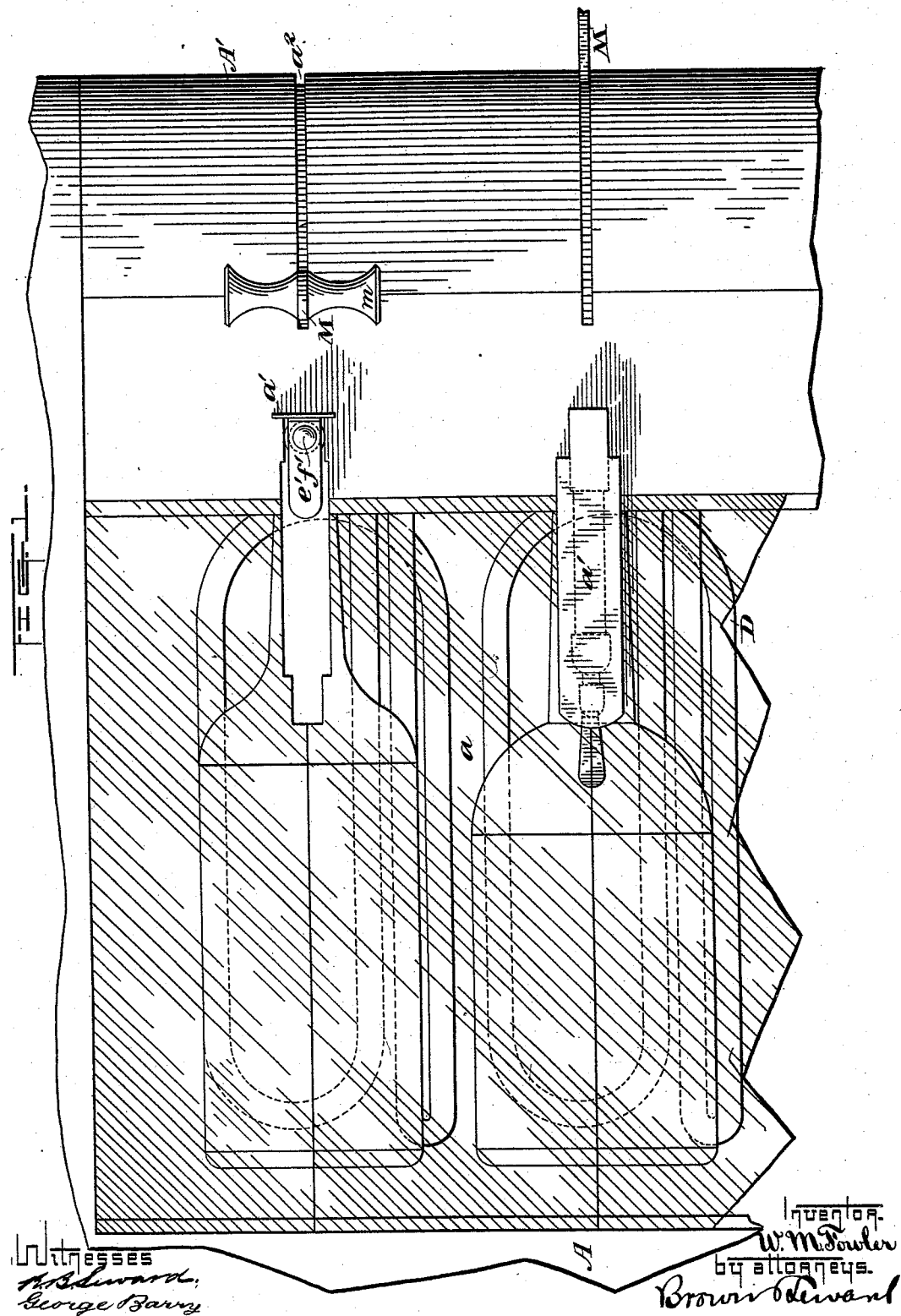

(No Model.) 3 Sheets—Sheet 2.
W. M. FOWLER.
LIQUID DISPENSING APPARATUS.
No. 522,322. Patented July 3, 1894.
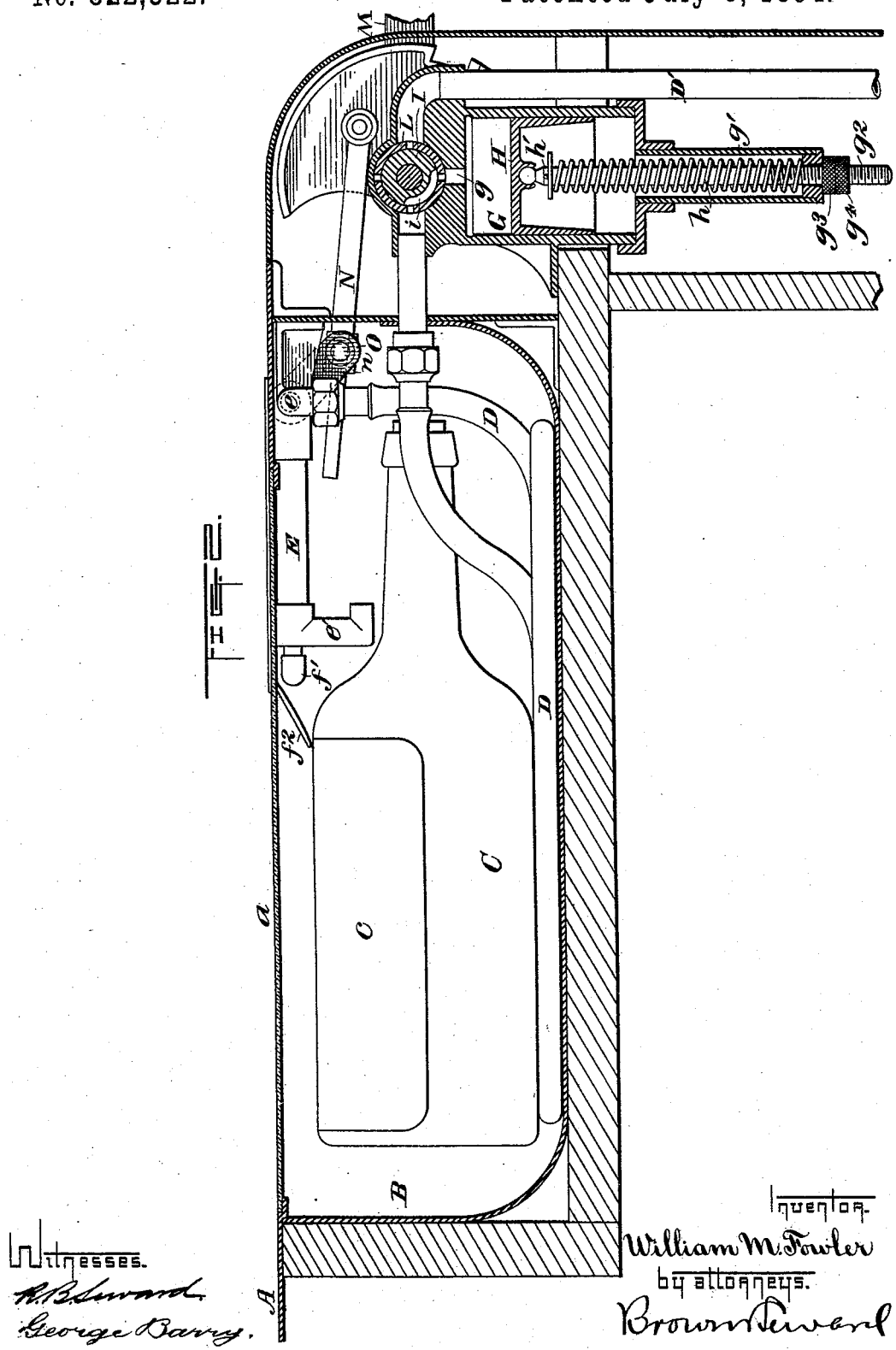
Witnesses.
R. B. Seward.
George Barry.
Inventor.
William M. Fowler
by attorneys.
Brown Seward (No Model.) 3 Sheets—Sheet 3.
W. M. FOWLER.
LIQUID DISPENSING APPARATUS.
No. 522,322. Patented July 3, 1894.
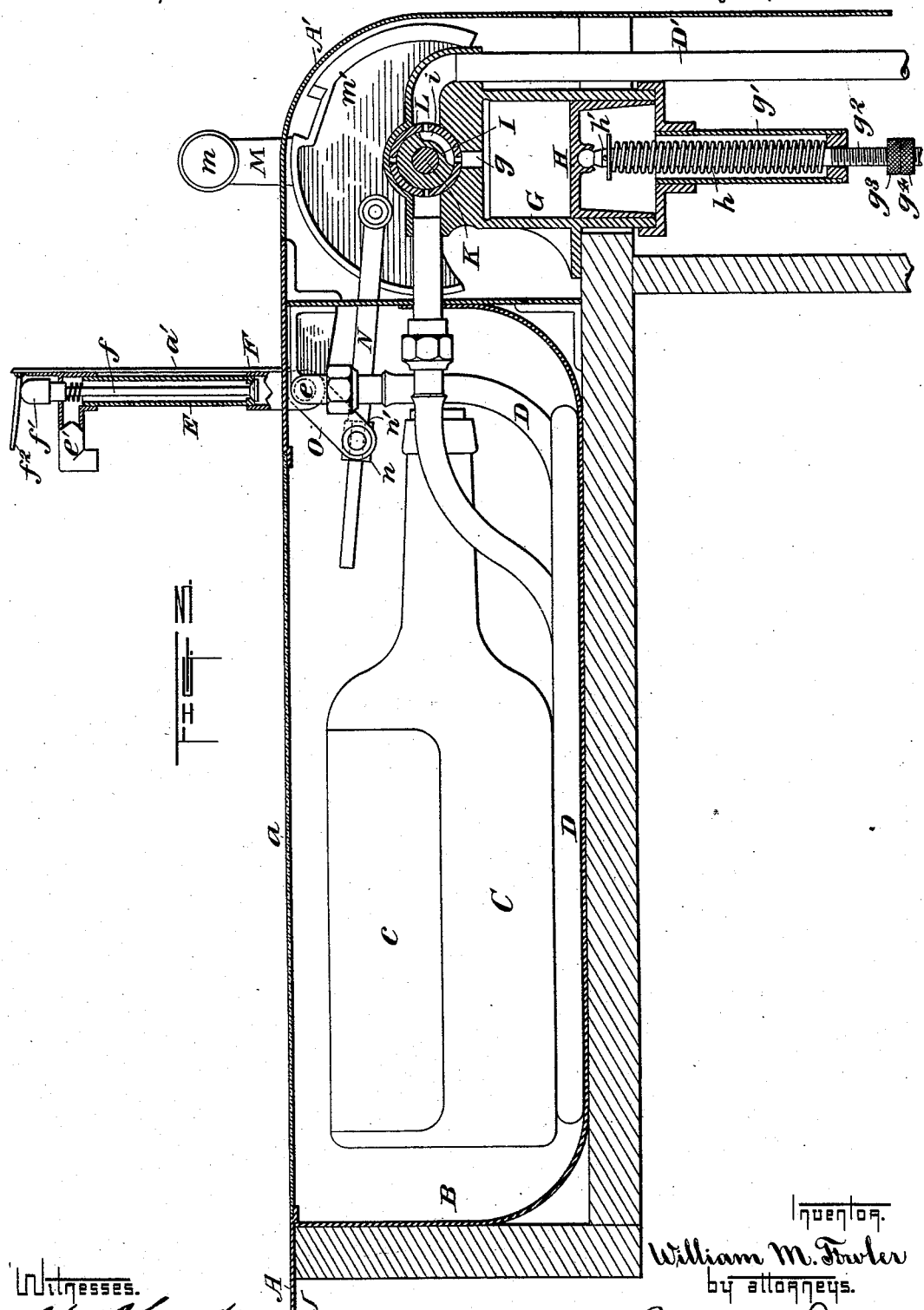
Witnesses.
Robert B. Seward
George Barry
Inventor.
William M. Fowler
by attorneys.
Brown Seward
THE NORRIS PETERS CO., PHOTO-LITHO., WASHINGTON, D. C.

UNITED STATES PATENT OFFICE.

WILLIAM M. FOWLER, OF MILFORD, CONNECTICUT.

LIQUID-DISPENSING APPARATUS.

SPECIFICATION forming part of Letters Patent No. 522,322, dated July 3, 1894.

Application filed October 4, 1893. Serial No. 437,157. (No model.)

*To all whom it may concern:*

Be it known that I, WILLIAM M. FOWLER, of Milford, in the county of New Haven and State of Connecticut, have invented a new and useful Improvement in Liquid-Dispensing Apparatus, of which the following is a specification.

My invention relates to an improvement in liquid dispensing apparatus in which provision is made for locating one or more sample packages of the liquid to be dispensed along the front bar in sight of the purchaser, in connection with a self-helping mechanism or mechanisms which are arranged to be thrown into operative position by the action of the attendant, during the operation of measuring the amount to be dispensed and registering the same.

In the accompanying drawings, Figure 1 represents a top plan view of a portion of a front bar, showing two sample packages of liquid and their respective self-helping and measuring mechanisms as they appear from the exterior, one of the self-helping mechanisms being shown elevated in operative position and the other in closed position. Fig. 2 is a transverse vertical section through a portion of the bar, showing the sample packages and self-helping mechanism in side elevation and the measuring mechanism in section, the self-helping mechanism being represented in its closed position; and Fig. 3 is a similar transverse section, showing the self-helping mechanism elevated in operative position and partly in section and the measuring mechanism in the position corresponding with the elevation or operative position of the self-helping mechanism.

It is to be understood that the number of sample packages and self-helpers and corresponding measuring mechanisms may be more or less than two, as may be found desirable and that whatever the number of such packages may be within reasonable limits, the measuring mechanisms corresponding thereto will be under the control of operating levers which during the measuring operation serve to operate a common register operating shaft about which they rock and which serves to prepare a record and register the prices in a manner quite similar to that shown, described and claimed in my Patent No. 490,823, granted January 31, 1893, and not shown herein.

The top of the bar is denoted by A and, for the purpose of exhibiting the sample package beneath it, it is preferably provided with transparent plates $a$ fitted therein over that portion of the bar where the sample packages are located. The bar is provided with a cooling chamber or cooling chambers B underneath its top, in which chamber or chambers the sample package or packages of the liquid to be dispensed are arranged. In the present instance I have shown the sample packages as consisting of bottles C with suitable labels $c$ so arranged that they can be read through the transparent plate $a$. Within the cooling chamber or chambers B the pipe or conduit D, through which the liquid to be dispensed is passed from the measuring receptacle to the self-helping mechanism, is coiled. I prefer to so arrange the coils that they shall lie beneath the sample packages C, the latter being so located with respect to the pipe D and the self-helping mechanism that the liquid presents the appearance of coming from the package C as it is drawn into the glass.

The self-helping mechanism consists of a tube E hinged as at $e$ so as to be rocked back and forth from its closed position, shown in Fig. 2, to and from its upright or operative position, shown in Fig. 3. At the point where the tube E is hinged it is also connected with the pipe D for the admission of liquid from the pipe D to the tube E. The tube E is provided at its upper end with a spout $e'$ and also is provided with a spring actuated valve F, preferably seated near its base and provided with a stem $f$ which extends upwardly through the top of the spout where it is provided with a head $f'$ on which pressure may be exerted to open the valve F either directly, by placing the finger on the head $f'$ or—as I prefer—by means of a valve operating lever $f^2$ hinged to the plate $a'$ at the back of the tube E and extending forwardly in position to bear upon the head $f'$. The plate $a'$ is intended to cover tightly the opening in the top of the bar through which the self-helping mechanism is elevated into operative position.

The measuring receptacle consists of a short cylinder G in which a spring actuated plunger H is adapted to slide. The end of the cylinder G opposite the plunger H is provided with a port $g$ through which the liquid enters the receptacle from a supply pipe D' connected with a suitable general supply, which supply is assumed to be under a sufficient head or pressure to overcome the tension of the spring $h$ which, by its connection with the plunger operating rod $h'$, tends to force the plunger H at all times toward the inlet end of the cylinder G. The plunger operating rod $h'$ extends through a tubular projection $g'$ of the cylinder G and is provided with a screw threaded end $g^2$ on which are seated an adjusting nut $g^3$ and a jam nut $g^4$ for the purpose of determining the extent of movement of the plunger H within the cylinder G and hence for determining the amount of liquid which may be dispensed at one time.

Communication between the cylinder and the supply and dispensing pipes D' and D is established and cut-off alternately by means of a rocking valve I seated on the register shaft K and within a sleeve L, and operated by a lever M which extends through a narrow slit $a^2$ in a housing A' at the inner side of the bar.

The housing A' is intended to completely inclose the measuring mechanism, so that it cannot be tampered with excepting by parties intentionally provided with the means for gaining access thereto. The valve operating lever M is conveniently provided at its outer end with a handle $m$ and within the housing A' it is provided with a segment $m'$, the extent of which segment is preferably a semi-circle or more, so that the rim of the segment may form a closure of the slit $a^2$ in the housing A' throughout the stroke of the lever M in either direction. The sleeve L is provided with ports in communication with the pipes D and D' and also in communication with the port $g$ leading to the interior of the cylinder G and the valve I is provided with a port $i$ which, when the operating lever M is in its upright position, forms open communication between the supply pipe D' and the interior of the cylinder G, cutting off at the same time communication between the cylinder and the pipe D, and when the operating lever M is in its depressed position, as shown in Fig. 2, the said port $i$ forms open communication between the interior of the cylinder G and the pipe D and at the same time cuts off communication between the supply pipe D and the interior of the cylinder G.

The segment $m'$ of the operating lever M is connected with the self-helping mechanism to elevate the latter into operative position, as the lever is depressed, as follows:

An operating rod N is loosely connected at one end to the segment $m'$ at a distance from the center of movement of said segment and at its opposite end it is provided with a slide $n$ swiveled to one end of an arm O, fixed to rock with the tube E. The rod N is provided with a shoulder $n'$ which forms the limit of the sliding movement of the slide $n$ on the rod in one direction, while the slide is permitted to move freely on the rod in the opposite direction. From this structure it will appear that when the lever M is depressed, as represented in Fig. 2, the self-helping tube E may be raised into upright position, if so desired, independently of the movement of the lever M, the slide $n$ simply moving along the rod N away from the abutment on the rod, and when the lever M is elevated, it will simply slide the rod N idly through the slide $n$ into the position shown in Fig. 3.

The operation is as follows:—The purchaser, having designated the liquid he wishes to purchase from the samples exposed to him, the attendant first lifts the lever M from its depressed to its upright position, permitting the designated liquid to flow from the supply into the measuring receptacle G, forcing back the plunger H and its actuating spring $h$. Such upward movement of the lever M, at the same time, through the rod N, will rock the self-helping tube E into its upright position, as shown in Fig. 3, provided the same has not been already elevated. The attendant will then depress the lever M, cutting off the supply of liquid and rocking the valve I in position to open communication between the measuring receptacle and the pipe D. The purchaser may now help himself to as much of the liquid as he wishes, by placing his glass under the spout $e'$ and depressing the valve F. When through, the tube E may be shut down within the bar, out of sight and out of the way of dust and injury and will be ready for a repetition of the operation whenever the demand is made.

While I prefer the use of transparent plates at the top of the bar above the cooling chamber in which the sample is located, such structure is not essential to the practical operation of the apparatus as the several different liquids to be displayed may be indicated by labels on the top of an opaque covering, or the labels may be omitted entirely and the matter left to the attendant to throw up into operative position the self-helper corresponding to any liquid which may be designated by the purchaser.

What I claim is—

1. In combination, a self-helping mechanism comprising a discharge conduit and a valve for opening and closing it, a measuring receptacle connected with a liquid supply and with the self-helping mechanism and a valve located at the juncture of conduits leading to the supply, to the measuring receptacle and to the discharge conduit for alternately opening and closing communication between the measuring receptacle and the supply and between the measuring receptacle and self helping mechanism, substantially as set forth.

2. In combination, a series of self-helping mechanisms each comprising a discharge conduit and a valve for opening and closing it, a measuring receptacle for each self-helping mechanism, connected with a liquid supply and with the self-helping mechanism, valves for opening and closing communication between each measuring receptacle and a supply and self-helping mechanism corresponding to the measuring receptacle, valve operating levers and a common rotary shaft about which the valve operating levers are mounted, substantially as set forth.

3. In combination, a self helping mechanism comprising a discharge conduit and a valve for opening and closing it, a measuring receptacle provided with a spring actuated plunger and connected with a liquid supply and with the self-helping mechanism and a valve for opening and closing communication between the measuring receptacle and the supply and self-helping mechanism, substantially as set forth.

4. In combination, a swinging self-helping mechanism comprising a discharge conduit and a valve for opening and closing it, a measuring receptacle connected with a liquid supply and with the self-helping mechanism, a valve for opening and closing communication between the measuring receptacle and the supply and self-helping mechanism, a valve operating lever and a connection between the valve operating lever and the swinging self-helping mechanism for throwing the self-helping mechanism into operative position during the operation of the valve, substantially as set forth.

5. In combination, a suitable cooling chamber provided with a transparent top, one or more sample liquid packages located within the cooling chamber beneath the transparent cover, a self-helping mechanism corresponding to each package and mounted along the top of the chamber to swing upwardly into operative position and downwardly out of sight, a measuring receptacle for each self-helping mechanism connected with a suitable supply and with the self-helping mechanism, a valve for controlling the admission of the liquid to and its discharge from the receptacle, valve operating mechanism and a connection between the valve operating mechanism and the swinging self-helping mechanism for swinging the self-helping mechanism simultaneously with the operation of the valve, substantially as set forth.

6. The combination with the discharge mechanism and the measuring receptacle connected with a supply and with the discharge mechanism, of a housing for inclosing the measuring receptacle, an elongated slit through the wall of the housing, a valve operating lever extending through the slit in the housing and provided with a segment within the housing, the rim of the segment being extended upon opposite sides of the operating lever to close the slit through the housing as the lever is moved in opposite directions along the slit, substantially as set forth.

7. The combination with the discharge mechanism, of a measuring receptacle connected with a supply and a discharge mechanism, means for controlling the admission of liquid to and its discharge from the measuring receptacle, a spring actuated plunger within the measuring receptacle and means for adjusting the plunger to increase or decrease the extent of its stroke within the chamber, substantially as set forth.

WILLIAM M. FOWLER.

Witnesses:
FREDK. HAYNES,
GEORGE BARRY.